Patented May 19, 1936

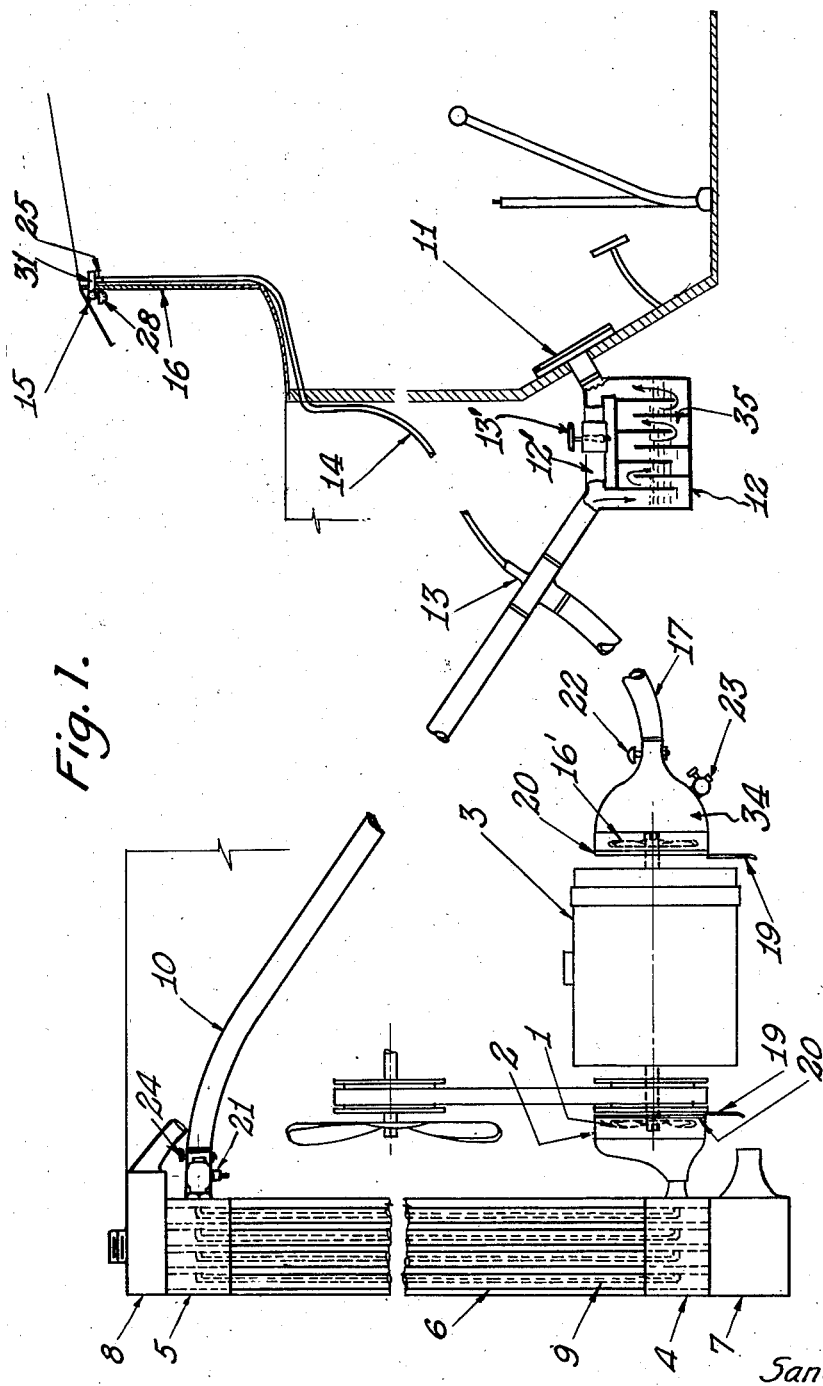

2,041,598

UNITED STATES PATENT OFFICE 2,041,598

AIR CONDITIONING SYSTEM FOR MOTOR VEHICLES

Sandro C. Farnese, Cambridge, Mass.

Application January 31, 1935, Serial No. 4,353

4 Claims. (Cl. 257—125)

This invention relates to air conditioning systems, and its general object is to provide a system of that character which is primarily designed for use with motor vehicles, and is capable of introducing heated or unheated air into the body of a vehicle, to provide comfortable temperature conditions for the occupants thereof, as well as to create circulation of air throughout the body.

A further object of the invention is to provide an air conditioning system that includes means for filtering the air, before it reaches the body of the vehicle, so that the air is not only fresh at all times but is free from dirt, dust and foreign matter, including gases.

Another object of the invention is to provide an air conditioning system that includes means for directing heated air against the windshield of the vehicle, to retain the same free from weather elements such as frost, snow, ice moisture and water, with the result a clear vision can be had at all times regardless of the weather conditions.

A still further object of the invention is to provide an air conditioning system that utilizes the water in the cooling system of the vehicle, as a heating medium for the air.

Another object of the invention is to provide an air conditioning system of the character set forth, that is reasonably simple, inexpensive to manufacture and install, and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the same, and in which:

The figure is a diagrammatic view illustrating my system applied to a motor vehicle.

Referring to the drawing in detail, it will be noted that I have illustrated my system installed on a motor vehicle which includes the usual body and hood.

I employ an air draft creating means which as shown, includes a fan or air blower 1 and the fan is mounted in a casing 2 that has extending into the rear end thereof the armature shaft of the generator 3 of the ignition system of the vehicle.

The radiator for the cooling system of the vehicle must be constructed primarily for my air conditioning system and includes the usual shell and core, with lower and upper air tanks or heads 4 and 5 respectively arranged within the shell. Extending through the air tanks 4 and 5 are water tubes 6 that have their upper and lower ends communicating with upper and lower water tanks or heads 7 and 8. Disposed in each of the water tubes 6 and having their upper and lower ends bent at right angles for disposal through the water tubes are air tubes 9 that are of a length so that the lower ends communicate with the air tank 4 and the upper ends with the air tank 5. The air tubes may be of any shape and constructed in any suitable manner, and may have means therein to retard the flow of air therethrough so as to assure proper heating thereof.

The water tanks are of course provided with the usual inlet and outlet means, and the casing 2 is connected with the inlet of the air tank 4, while a conduit 10 has one end connected to the outlet of the tank 5.

A ventilator element 11 is secured to the inclined portion of the floor board of the vehicle and is in communication with a filtering element 12 that has the opposite end of the conduit or hose 10 in communication therewith, so that air from the hose 10 can pass through the filtering element to remove dirt, dust and foreign matter therefrom, before reaching the body of the vehicle, through the instrumentality of the ventilator 11. However, I employ a by-pass pipe 12' that is in direct communication with the hose 10 and the ventilator, and the by-pass pipe 12' has a valve 13' arranged therein for closing the direct communication as will be apparent.

Intermediate the ends of the hose 10, I provide a four-way connector 13 that includes a relatively small nipple having one end of a tubing 14 secured thereto for communication with the hose 10.

Secured to the upper end portion of the vehicle body above the windshield to extend lengthwise thereof, is what I term a windshield blower 15 that includes a body of tubular formation, with semi-spherical nozzles 28 secured thereto. The nozzles 28 are provided with a plurality of outlet openings. The body may be provided with outlet openings or slotted longitudinally, instead of the nozzles, as shown.

The tubing 14 is connected to the windshield blower through the instrumentality of an inlet pipe section 31 and a valve 25 is provided for controlling the supply of air to the nozzles 29, with the result it will be seen that the heated air from the radiator is directed toward the windshield which is indicated by the reference numeral 16 to retain the same free from weather elements such as snow, ice, frost, moisture or water.

The casing 2 is mounted adjacent to the forward end of the generator 3 and a somewhat similar casing indicated by the reference numeral 34 is mounted adjacent to the rear end and has extending therein an extension of the armature shaft of the generator. Mounted upon that end of the armature shaft is a fan 16' which is disposed within the casing 34 and this casing is provided with a reduced outer end upon which is mounted one end of a conduit or hose 17, while its opposite end is connected to the remaining arm of the four-way connector 13, so that draft created by the fan 16' will be directed to the hose 10. In place of the fans, air pumps or any draft creating means may be employed.

Each of the casings 2 and 34 have depending therefrom air deflectors 19, and the face of the casing 34 is closed by a screen 20.

The upper air tank is provided with a release valve 21 which as shown is in the form of a petcock, and a valve 22 is disposed at the outlet end of the casing 34 to control the passage of air through the hose 17. A release valve 23 is provided for the casing 34 to allow the air to escape therefrom when the valve 22 is closed. The air outlet for the air tank 5 is likewise provided with a valve 24 so that the passage of air through the hose 10 can be controlled.

The tubes of the radiator are preferably arranged in vertical rows and the rows are disposed at an inclination or diagonally with respect to the shell, so that the tubes act in the capacity as deflecting means for air passing through the radiator, with the result proper contact of the air with all the tubes is practically assured. The radiator, of course includes the usual cooling fins, and drain cock.

The filtering element in the form as disclosed includes a receptacle adapted to receive an air filtering medium, such as water or chemicals and has arranged therein a plurality of deflector plates 35, alternately rising from the bottom and depending from the top for disposal in parallel relation with respect to each other, to provide a zigzag passage for the air as it is passed through the receptacle, and therefore bring about complete cleansing thereof as will be apparent.

From the above description and disclosure of the drawing, it will be noted that my system is actuated by the generator 3 of the ignition and lighting system of the vehicle, consequently when the generator is running, the fan 1 will draw air through the rear of the casing 2 and direct the air through the air tubes 9. In its passage through the tubes 9 the air will be heated and will thence be directed through the hose 10 to the filtering element 12 for passage through the ventilator 11. When the heated air is used, the valve 24 is open, the valve 22 is closed and a release valve or petcock 23 is open.

When it is desired to supply unheated air from the casing 34, to the body of the vehicle, the valve 24 is closed and the release valve or petcock 21 is open, as well as the valve 22, but of course the release valve or petcock 23 is closed, with the result the fan 16' will draw air within the casing 34 and direct the air to the hose 10 through the medium of the hose 17. This air is likewise sent through the filtering element and thence directed to the ventilator 11. Of course, the valve 13' can be open in any event, but it is desirable that the valve 13' be closed so that the air will pass through the filtering element.

Either unheated air from the casing 34 or heated air from the radiator can be directed to the windshield blower, and the air from the casing 34 will blow moisture and water from the windshield, while the heated air will remove frozen weather elements such as ice, snow and frost, consequently the windshield can be retained in proper condition and a clear vision had at all times.

By the use of my system, it will be apparent that the temperature within the body of the vehicle can be retained substantially uniform, regardless of weather conditions, and circulation of either heated air from the radiator or unheated air from the casing 34, can be maintained through the body to assure complete comfort of the occupants. It will be apparent that the circulation can be created by lowering one of the rear windows of the body, or a suitable outlet ventilator or the like can be arranged at an appropriate place within the body.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An air conditioning system for a motor vehicle body and comprising air draft creating means, means arranged in the water tubes of the radiator of the vehicle to receive some of the air from the air draft creating means to heat the same, an outlet ventilator in the body, means for conveying all the air to the ventilator, and means to control the flow of either heated or unheated air to the ventilator.

2. An air conditioning system for a motor vehicle body and comprising air draft creating means, air tubes arranged in the water tubes of the radiator of the vehicle to receive some of the air from the first mentioned means for heating the same, an outlet ventilator arranged in the body, means for conveying the air to the ventilator, air filtering means in the conveying means, and controlling means to allow either the heated or unheated air to the ventilator.

3. An air conditioning system for the body of a motor vehicle comprising air draft creating means, means for directing some of the air to the radiator of the vehicle, air tubes mounted in the water tubes of the radiator to receive the air for heating the same, an outlet ventilator arranged in the body, a conduit for conveying the heated air from the radiator to the ventilator, a conduit for conveying air direct from the air draft creating means to the ventilator, and means for controlling the passage of all the air to the ventilator.

4. An air conditioning system for the body of a motor vehicle comprising a pair of casings, air draft creating means disposed in each casing, upper and lower air tanks arranged in the radiator of the vehicle, air pipes arranged in the water tubes of the radiator and communicating with the upper and lower air tanks, means of communication between one of said casings and the lower air tank, an outlet ventilator disposed in the body, means for conveying air to the outlet ventilator from the upper air tank, means for conveying air from the other casing direct to the first mentioned conveying means and means for controlling the passage of air through both of the conveying means.

SANDRO C. FARNESE.